United States Patent [19]
Oehry

[11] 3,940,587
[45] Feb. 24, 1976

[54] ADJUSTABLE STOP FOR A BOLT WELDING GUN

[75] Inventor: Norbert Oehry, Fl-Schaan, Liechtenstein

[73] Assignee: Hilti Aktiengesellschaft, Schaan, Liechtenstein

[22] Filed: Oct. 11, 1974

[21] Appl. No.: 514,215

[30] Foreign Application Priority Data
Oct. 15, 1973 Germany............................ 2351692

[52] U.S. Cl. ................................................. 219/98
[51] Int. Cl.² .............................................. B23K 9/22
[58] Field of Search ............................... 219/98, 99

[56] References Cited
UNITED STATES PATENTS

| | | | |
|---|---|---|---|
| 2,451,152 | 10/1948 | Candy | 219/98 |
| 2,462,882 | 3/1949 | Martin | 219/98 X |
| 2,467,723 | 4/1949 | Barlow | 219/98 |
| 2,473,871 | 6/1949 | Edels | 219/98 |
| 3,059,095 | 10/1962 | Graham | 219/98 |

*Primary Examiner*—J. V. Truhe
*Assistant Examiner*—D. A. Tone
*Attorney, Agent, or Firm*—Toren, McGeady and Stanger

[57] ABSTRACT

A welding gun for a capacitor discharge bolt welding device includes a thrust unit axially movably positionable within the housing. A collet chuck is fitted on the forward end of the thrust unit and holds individual bolts in position for the welding operation. A stop threadedly secured within the housing is adjustably positionable in the axial direction of the thrust unit relative to the housing for selectively adjusting the lead between the forward end of a bolt held in the collet chuck and the forward end of the supporting feet extending axially from the forward end of the housing.

10 Claims, 1 Drawing Figure

U.S. Patent  Feb. 24, 1976  3,940,587
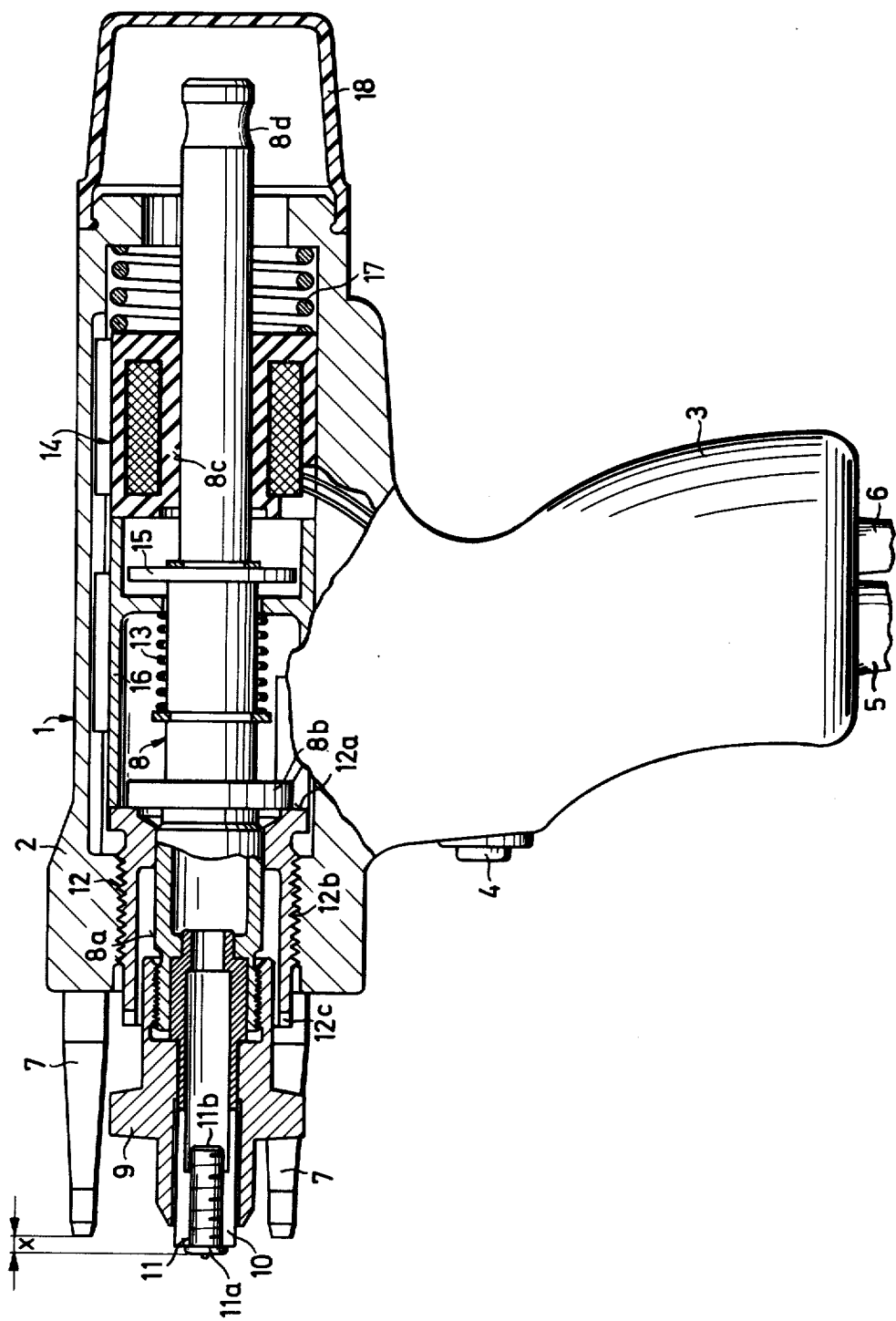

ADJUSTABLE STOP FOR A BOLT WELDING GUN

SUMMARY OF THE INVENTION

The present invention is directed to a welding gun for a capacitor discharge bolt welding device and, more particularly, it concerns an adjustably positionable stop for the welding gun. The welding gun includes a housing having supporting feet extending from its forward end and thrust unit mounted within the housing so that it can be displaced in its axial direction and extend forwardly from the forward end of the housing. A collet chuck is fitted on the forward end of the thrust unit for holding individual bolts to be welded to a workpiece. Within the housing, a holding magnet retains the thrust unit in a rearward position, ready to displace the bolt forwardly against the workpiece in carrying out the welding operation. In its forward position the thrust unit is at rest and is biased against the stop by the force of a spring. When the thrust unit is at its forward or rest position an axial distance or lead is provided between the free or forward ends of the supporting feet and the outwardly facing end of a bolt held in the collet chuck. The extent to which the bolt is inserted into the collet chuck is determined by a limiting surface. The lead can be adjusted by adjusting the stop relative to the housing.

In welding operations using known welding guns of the general type described above, the bolt to be welded is lifted off the surface of the workpiece by a certain dimension, the air gap, and is accelerated in a direction of the workpiece by the force of the spring. The movement of the bolt toward the workpiece is accomplished by a thrust unit which is axially movable over a certain distance within the housing of the welding gun and is retained in position ready for the welding operation against the biasing spring force, by a holding magnet.

To provide good welding results, the leading bolt surface must strike the workpiece with a defined force. In other words, at the moment the bolt strikes the workpiece, the thrust unit must not have reached its most forward position. Therefore, in the rest position of the welding gun, a bolt held in the collet chuck can lead or extend forwardly from the front ends of the supporting feet by a certain axial dimension. The force with which the bolt strikes the workpiece depends on this dimension which, as indicated above, is also called the lead.

Up to the present time, the only lead adjustments which have been known involved considerable disadvantages.

As an example, known welding guns have supporting feet extending from the gun housing which are adjustable in length. To provide a geometrically defined support, three supporting feet are normally used. However, when a triple adjustment is required it becomes difficult to position the welding gun precisely perpendicular to the workpiece surface, as is required for optimum welding. Furthermore, such adjustment is very time-consuming.

Therefore, limiting pins have been used as a stopping or limiting surface, adjustably positionable within the collet chuck and adaptable to the length of a respective bolt. However, the adjustment of such a limiting pin requires special measuring means and, in addition, makes the handling of the welding gun more difficult for the operator. Additionally, there is a considerably amount of wasted time caused by the need to readjust over and over again for different bolt lengths.

An object of the present invention is to provide a welding gun in which the axial distance between the free or forward end of the supporting feet and the forwardly facing surface of the bolt is adjustable in a simple manner without any special tool expense.

In accordance with the present invention, the adjustment problem is solved by providing a stop for the thrust unit which is adjustable relative to the housing.

The adjustability of the stop is particularly advantageous because the adjustment can be made within a short period of time because the adjustment involves the movement of only one member relative to another. In contrast to adjusting supporting feet, the axial movement of the stop does not alter the perpendicular position of the welding gun relative to the surface of the workpiece. Moreover, as compared to an adjustable limiting pin, the stop has the advantage that the adjustment need only be made once. Therefore, the need for an adjustable limiting pin is obviated. In carrying out the welding operation the bolt is simply inserted into the collet chuck until its shoulder rests against the end face of the chuck. If the bolts do not have a shoulder which can provide this limiting surface, it is possible to use fixed limiting pins adaptable to the respective bolt lengths, such pins are exchangeable and are inserted into the collet chuck.

It is advantageous to form the stop in the shape of a bushing. From a production point of view, such a shape is easy to manufacture. Moreover, such a bushing-shaped stop can be easily guided in the housing.

It is expedient for design reasons that the thrust unit be guided, if possible, adjacent to the collet chuck. Since, for reasons of accessibility, the stop extends outwardly from the forward end of the housing to permit adjustment, it is advantageous to arrange the stop as the forward guiding means for the thrust unit with its inside diameter providing a sliding fit for the outside diameter of the thrust unit which passes through the guiding means.

For the adjustability of the stop it is preferable to afford a threaded connection between it and the housing. Such a connection makes any additional and complicated adjusting elements not necessary.

It is advantageous if the threaded connection is formed with fine threads for the precise adjustment of the stop. The use of fine threads facilitates the adjustment and improves the non-reversibility of the stop.

To facilitate the adjustment it is preferable if the forward end of the stop directed outwardly from the housing is provided with radial slots into which adjusting tools can fit. Such slots are easy to form and they avoid the need of expensive special tools for performing the stop adjustment.

The spring travel is made up of the preload of spring in assembly, the lead and the air gap. The maximum spring force is determined by the spring constant and the total spring travel. To assure that any adjustment of the lead will not result in modification of the total spring travel and, as a result, effect no change in the maximum spring force, it is advantageous if the holding magnet which secures the thrust unit in the ready position is in positive connection with the stop so that both of them move through the same distance. This arrangement causes the stroke made up of the lead and the air gap to remain the same and the holding magnet is always in position to overcome the maximum spring force.

To bridge the separation between the stop and the holding magnet, it is preferable if a bushing-shaped adapter is positioned between and in contact with these two parts. The adaptor transmits axial motion between the stop and the holding magnet.

To facilitate the operation of the welding gun, it is advantageous to position a compression spring between the holding magnet and the rearward end of the housing. As an independent positioning member, the compression spring assures that the magnet is constantly disposed in positive connection with the stop. Additionally, the spring automatically equalizes any length changes due to temperature variations.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

The drawing is a side view, partly in section, of a welding gun embodying the present invention.

DETAILED DESCRIPTION OF THE INVENTION

In the drawing a welding gun 1 is illustrated with its forward end extending to the left and its rearward end extending to the right. The welding gun includes a housing 2 forming an axially extending space between the forward and rearward ends of the gun and a handle 3 is attached to the housing and extends outwardly from it, intermediate the ends. The handle contains a trigger 4, and electric leads 5 and 6 for the welding and control current terminate in the handle 3 and can be seen extending from the bottom of the handle. The left or forward end of the housing 2 has a number of supporting feet 7 extending axially outwardly from the housing. A thrust unit 8 is mounted in the housing for movement in the axial direction between its forward and rearward ends. A collet chuck 10 is fitted to the forward end of the thrust unit 8 by means of a cap unit 9. As shown in the drawings, a bolt 11 is inserted into the collet chuck 10 and, as illustrated, the shoulder 11a extending outwardly from one end of the bolt, rests against the forward end of the collet chuck. It is also possible to insert the bolt 11 into the collet chuck 10 until its rearward end 11b contacts an exchangeable limiting pin in the collet, the limiting pin being adaptable to the length of a respective bolt. Such limiting pins are known and, as a result, have not been shown.

The forward end of the thrust unit 8 is positioned within the housing so that it is axially movable within an adjustable stop 12. In its forward or rest position, that is, when the thrust unit is displaced toward the left or forward end of the housing, such as when the welding gun is not in operation or has not been placed against a workpiece, a shoulder 8b on the thrust unit is biased by a spring 13 against the rearwardly facing surface 12a of the adjustable stop 12. The stop 12 is in threaded engagement with the housing 2 by means of a fine thread 12b formed on its outer surface. Radially extending slots 12c are provided on the left or forward end of the stop 12 which extends outwardly from the forward end of the housing. The slots 12c facilitate the adjustment of the stop 12 relative to the housing 2. As shown at the lefthand end of the welding gun, a lead $x$ extends between the forwardly facing end of the bolt 11 and the forward or free ends of the supporting legs 7 and it is adjustable by a certain amount. The adjustment of the lead is necessary, for instance, to compensate for manufacturing tolerances. Normally, the adjustment is made in the manufacturer's plant.

Within the housing 2 adjacent its rearward end is a holding magnet 14 disposed laterally about the rearward or righthand end portion of the thrust unit. The holding magnet 14 serves as a guide for a rearward portion 8c of the thrust unit. When a bolt 11 is placed in the collet chuck 10, the entire thrust unit 8 can be simultaneously moved in the righthand direction of the drawing against the force or spring 13 until an armature disc 15 on the thrust means contacts the holding magnet 14. The holding magnet secures the thrust unit in its rearward position, that is, its ready position so that the bolt can be displaced forwardly against a work surface or workpiece in performing the welding operation.

With the thrust unit 8 of the welding gun 1 in the ready position, it can be placed against a workpiece or work surface for carrying out the welding operation. In the ready position, the bolt 11 is spaced from the surface to which it is to be welded by a certain amount called the gap. When the trigger button 4 is actuated, the circuit of the holding magnet is broken and the thrust unit is accelerated in the leftward or forward direction as viewed in the drawing by the force of the spring 13. Shortly before the forward end of the bolt contacts the workpiece or work surface, the arc is ignited and the actual welding operation initiated.

A positive connection or biasing of the holding magnet 14 with the stop 12 is provided so that any adjustment of the stop does not result in a change in the thrust and, accordingly, in the force imparted to the bolt. In the example shown in the drawing, the connection or biasing action between the holding magnet 14 and the stop 12 is provided over a bushing-shaped adapter 16. Rearwardly of the holding magnet, a cylindrical compression spring 17 is provided around the thrust means 8 and constantly biases the magnet against the stop by means of the intermediate adapter 16.

For precise spot welding it is possible to move the bolt 11 into the ready position after the welding gun is placed against the work surface, by removing a cap 18 on the rearward end of the housing and by retracting the rearward end 8d of the thrust unit 8.

While a specific embodiment of the invention has been shown and described in detail to illustrate the application of the inventive principles, it will be understood that the invention may be embodied otherwise without departing from such principles.

What is claimed is:

1. Welding gun for a capacitor discharge welding device comprising a housing forming an axially extending space therein having a forward end from which a bolt is welded to a workpiece and a rearward end, a plurality of supporting feet secured to and extending axially outwardly from the forward end of said housing, a thrust unit mounted in the space in said housing for movement in the axial direction of the space between a forward rest position and a rearward position in which position the thrust unit is held ready to be displaced forwardly for carrying out the welding operation, said thrust unit having a forward end adjacent the forward end of said housing and an oppositely directed rearward end closer to the rearward end of said housing, a collet chuck supported at the forward end of said thrust unit and extending axially outwardly therefrom and arranged to hold a bolt in position prior to the welding operation, a holding magnet located within and adjacent the rearward end of said housing, said holding magnet arranged to releaseably hold said thrust unit in its rearward position, a stop positioned within said housing in the path of movement of said thrust unit toward its forward rest position, said thrust unit including a spring biasing said thrust unit toward said stop and holding said thrust unit against said stop when said thrust unit is in the forward rest position, said collet chuck including stop means limiting the extent to which a bolt is inserted into the collet chuck, the axial dimension denominated as the lead in the forward rest position of said thrust unit between the free ends of said supporting feet spaced forwardly from the forward end of said housing and the forwardly located end of the bolt held in said collet chuck against said stop means and facing outwardly from said housing and forwardly of the free ends of said supporting feet being adjustable, wherein the invention comprises that said stop is axially adjustable relative to said housing and affords adjustment for the lead between the free ends of said supporting feet and the outwardly facing end of the bolt held in the collet chuck.

2. Welding gun, as set forth in claim 1, wherein said stop is in the form of an axially extending bushing.

3. Welding gun, as set forth in claim 2, wherein said bushing-shaped stop forms axially extending guide means for said thrust unit.

4. Welding gun, as set forth in claim 3, wherein the diameter of the guide means provided by said bushing-shaped stop fits in sliding engagement with the diameter of said thrust unit for which it provides a guide.

5. Welding gun, as set forth in claim 2, wherein the outer surface of said stop is threaded to provide a screw connection with a threaded surface in the interior of said housing.

6. Welding gun, as set forth in claim 5, wherein the threaded portion of said stop and of said housing are formed with fine threads.

7. Welding gun, as set forth in claim 2, wherein the end of stop facing in the same direction as the forward end of said housing has radially extending slots.

8. Welding gun, as set forth in claim 1, wherein means are arranged for providing a positive connection between said holding magnet and said stop.

9. Welding gun, as set forth in claim 8, wherein said means for providing a positive connection comprises a bushing-shaped adaptor located within said housing laterally enclosing said thrust unit and extending between and in contact with said holding magnet and said stop.

10. Welding gun, as set forth in claim 9, wherein a second spring is positioned within the rearward end of said housing rearwardly of said holding magnet and extending between and in contact with said holding magnet and said housing for biasing said holding magnet forwardly against said bushing-shaped adaptor.

* * * * *